(12) United States Patent
Faisman et al.

(10) Patent No.: US 8,370,162 B2
(45) Date of Patent: Feb. 5, 2013

(54) AGGREGATING MULTIMODAL INPUTS BASED ON OVERLAPPING TEMPORAL LIFE CYCLES

(75) Inventors: Alexander Faisman, Croton-On-Hudson, NY (US); Dimitri Kanevsky, Ossining, NY (US); David Nahamoo, White Plains, NY (US); Roberto Sicconi, Ridgefield, CT (US); Mahesh Viswanathan, Yorktown Heights, NY (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 13/242,538

(22) Filed: Sep. 23, 2011

(65) Prior Publication Data
US 2012/0046945 A1 Feb. 23, 2012

Related U.S. Application Data

(63) Continuation of application No. 10/795,495, filed on Mar. 7, 2004, now abandoned.

(51) Int. Cl.
*G10L 21/00* (2006.01)
*G10L 15/00* (2006.01)
*G10L 15/04* (2006.01)

(52) U.S. Cl. .................. 704/275; 704/231; 704/251

(58) Field of Classification Search .................. None
See application file for complete search history.

(56) References Cited

U.S. PATENT DOCUMENTS

| | | | |
|---|---|---|---|
| 5,884,249 A * | 3/1999 | Namba et al. | 704/9 |
| 6,167,376 A | 12/2000 | Ditzik | |
| 6,990,639 B2 | 1/2006 | Wilson | |
| 6,996,800 B2 | 2/2006 | Lucassen et al. | |
| 7,054,421 B2 | 5/2006 | Kandlur et al. | |
| 7,069,215 B1 * | 6/2006 | Bangalore et al. | 704/255 |
| 7,260,535 B2 | 8/2007 | Galanes et al. | |
| 7,337,405 B2 | 2/2008 | Weng et al. | |
| 7,533,014 B2 * | 5/2009 | Mao | 704/9 |
| 2002/0135618 A1 * | 9/2002 | Maes et al. | 345/767 |
| 2002/0178344 A1 * | 11/2002 | Bourguet et al. | 712/1 |
| 2003/0046316 A1 | 3/2003 | Gergic et al. | |
| 2003/0046401 A1 | 3/2003 | Abbott et al. | |
| 2004/0093215 A1 * | 5/2004 | Gupta et al. | 704/270 |
| 2004/0104265 A1 | 6/2004 | Okada et al. | |
| 2005/0080629 A1 | 4/2005 | Attwater et al. | |
| 2005/0136897 A1 | 6/2005 | Praveenkumar et al. | |

\* cited by examiner

*Primary Examiner* — Jesse Pullias
(74) *Attorney, Agent, or Firm* — Wolf, Greenfield & Sacks, P.C.

(57) ABSTRACT

In a voice processing system, a multimodal request is received from a plurality of modality input devices, and the requested application is run to provide a user with the feedback of the multimodal request. In the voice processing system, a multimodal aggregating unit is provided which receives a multimodal input from a plurality of modality input devices, and provides an aggregated result to an application control based on the interpretation of the interaction ergonomics of the multimodal input within the temporal constraints of the multimodal input. Thus, the multimodal input from the user is recognized within a temporal window. Interpretation of the interaction ergonomics of the multimodal input include interpretation of interaction biometrics and interaction mechani-metrics, wherein the interaction input of at least one modality may be used to bring meaning to at least one other input of another modality.

17 Claims, 4 Drawing Sheets

AGGREGATING MULTIMODAL INPUTS BASED ON OVERLAPPING TEMPORAL LIFE CYCLES

RELATED APPLICATIONS

This application is a Continuation of U.S. patent application Ser. No. 10/795,495, filed on Mar. 7, 2004 now abandoned, which is incorporated herein by reference in its entirety.

FIELD OF THE INVENTION

The present invention relates generally to a voice processing system, and more particularly, to aggregating a plurality of modalities in a voice processing system.

BACKGROUND

With recent progress in the data processing technology, more systems are made which take into account user ergonomics. That is, more systems are made available which adjust to the user's environment, or adapt to various conditions that suit the user.

Ergonomics may include user interactions of various modalities, which may include interaction biometrics or interaction mechanic-metrics. User interaction biometrics may include stable patterns in the user's body or behavior related to interaction or the user's constant patterns that reflect the user's intentions or reactions. Such interaction biometrics may include conversational biometrics, behavioral biometrics, and speech biometrics in domains such as verification, identification or user emotional states. Interaction mechani-metrics are invariants in machine interface in response to the user's interaction with the interface.

In operation, a user connects to the voice processing system to request access to any of a plurality of different applications, including directory assistance, e-commerce, voice-mail, personal information management, database access and the like. The interaction between the user and the voice processing systems may take many forms, including: a remote user dialing into a computerized voice response system, a user speaking in a microphone on a desktop computer connected to a network or a voice processing system in an automobile, a user of portable digital assistants connected to a wireless network, a user as a participant of a meeting with several microphones around the room, or a user of other devices with speech input capability.

The various modalities of the user's interactions with the voice processing system may include interaction biometrics, such as the user's speech pattern, and interaction mechani-metrics, such as a triggering of an event such as the user's selection of a button. Based on the user's interaction, the various applications are accessed by the user, and feedback is provided to the user.

SUMMARY OF THE INVENTION

With the recent progress in voice processing systems, it is desirable to have a voice processing system which may receive a plurality of user input of various modalities. For example, it is desirable to have a voice processing system in which a multimodal request is received from a plurality of modality input devices, and the requested application is run to provide a user with the feedback of the multimodal request.

In accordance with the exemplary aspects of this invention, a multimodal aggregating unit is provided which receives a multimodal input from a plurality of modality input devices, and provides an aggregated result to an application control based on the interpretation of the interaction ergonomics of the multimodal input within the temporal constraints of the multimodal input.

In accordance with these exemplary aspects of this invention, the multimodal input from the user is recognized within a temporal window.

In accordance with the exemplary aspects of this invention, interpretation of the interaction ergonomics of the multimodal input include interpretation of interaction biometrics and interaction mechani-metrics, wherein the interaction input of at least one modality may be used to bring meaning to at least one other input of another modality.

In accordance with the exemplary aspects of this invention, the multimodal input includes one or more of the following modalities or their combination touch, speech, gestures, eye movements, face direction, and the like.

In accordance with one exemplary aspect of this invention, touch gestures from a first modality input device are aggregated with voice commands from a second modality input device. In accordance with this exemplary aspect, the voice commands provide new meanings for the touch gestures.

DETAILED DESCRIPTION OF THE INVENTION

Figure 1:
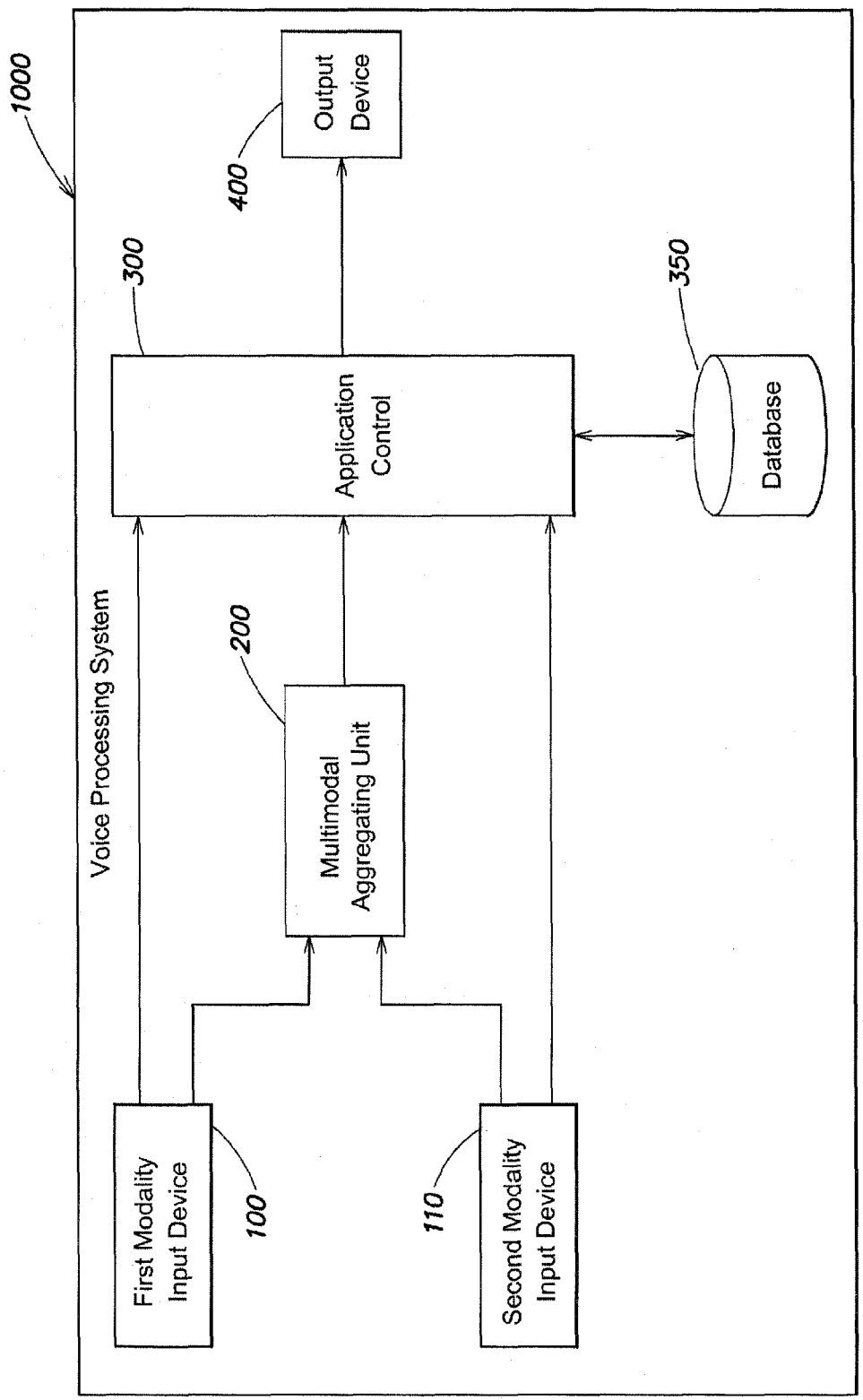
FIG. 1 shows an exemplary speech processing system embodying the exemplary aspects of the present invention.

The following description details how exemplary aspects of the present invention are employed. Throughout the description of the invention, reference is made to FIGS. 1-4. When referring to the figures, like structures and elements shown throughout are indicated with like reference numerals.
Description of the Preferred Embodiments In FIG. 1, an exemplary voice processing system 1000 embodying the exemplary aspects of the present invention is shown. It is initially noted that the voice processing system 1000 of FIG. 1 is presented for illustration purposes only, and is representative of countless configurations in which the exemplary aspects of the present invention may be implemented. Thus, the present invention should not be considered limited to the system configuration shown in the figure.

As shown in FIG. 1, the voice processing system 1000 includes a plurality of modality input devices 100 and 110, a multimodal aggregating unit 200, an application control 300 with database 350, and an output device 400.

It should be appreciated that, in accordance with the exemplary aspects of this invention, the multimodal input of various modalities from the plurality of modality input devices 100 and 110 may include biometrics input and mechani-metrics input, whereby user interaction ergonomics may be provided to adapt to various conditions that suit the user. The modalities from the modality input devices 100 and 110 may include, for example, one or more of touch, speech, gestures, eye movements, face direction, and other modalities whereby data relating to user interaction ergonomics are input. For example, the plurality of modality input devices 100 and 110 include one at least one of a speech recognition device, a touch parameter detector, a touch screen, a microphone, a camera, an eye movement detector, and the like.

In an example, the touch parameter detector may include a detector for detecting stress, duration, movement directions, shapes of trajectories, and the like, associated with the user's touch. Thus, the touch parameter detector may detect stable marks left on a touch screen by a user via touch, such as circles, squares, parts of geometric figures, rings, lines, predetermined and consistency in the touch, such as movement, change appearance, disappearance, or glow of the touch. These touch gestures are not limited to just pointing, but may include a slide of finger across screen to indicate scroll, a more rapid slide to indicate larger real estate to be covered during scrolling, a lateral motion to cancel actions similar to crossing out a line of text, a circling with a finger tip to select an area, thin rings that change color as they expire, and the like. In various exemplary aspects of this invention, a user's screen touch parameters may be indicated using visual feedback, such as the duration of touch, the vertical sliding to change the zoom factor, the horizontal sliding to change type of view, diagonal sliding diagonally to frame a view, pushing near the corners of the display to pan a view, a changing of the "shape" of the icon underneath the finger to indicate to the user know that the machine understood the meaning of the gesture, and the like.

It should be appreciated that the above described aspects are merely examples set forth to better describe the embodiments of this invention, and that this invention is not limited to the examples set forth above. For example, the modalities input to the voice processing system 1000 may include sounds produced by a system to cause user attention such as a high pitch tone, one or more visual/audio stable behavioral patterns on user display/player, a set of visual/audio patterns changing/appearing/disappearing in predetermined fashion, a set of geometric figures appearing on the display with some time intervals, a set of system mechanical responses that are reflection of user actions on sensors, a set of system mechanical responses that provide information response to users, intrinsic relationship between different mechanic interface modalities, such as time, space, synchronous, asynchronous, constant, and the like.

In operation, input of a first modality is received at the first modality input device 100, while input of a second modality is received at the second modality input device 110. The first modality input device 100 determines whether the request from the input of the first modality calls for applications which require only input of the first modality. If so, the input of the first modality is sent to application control 300, where applications requiring only input of the first modality are run. Else, the input of the first modality is sent to the multimodal aggregating unit 200.

Similarly, the second modality input device 110 determines whether the request from the input of the second modality calls for applications requiring only input of the second modality. If so, the input of the second modality is sent to application control 300, where applications requiring only input of the second modality are run. Else, the input of the second modality is sent to the multimodal aggregating unit 200 to be aggregated with the input of the first modality.

In the multimodal aggregating unit 200, the input from the plurality of modality input devices are aggregated, and the aggregated request is decoded and sent to the application control 300. In the application control 300, the various separate applications are run based on the input of the various modalities and the aggregated multimodal input and data stored in the database 350. That is, based upon the particular arriving task and the requested applications, the request is processed. The application result is output to the output device 400 to be fed back to the user.

As discussed above, though the exemplary embodiment above describes voice processing system 1000 in a particular embodiment, the voice processing system 1000 may be any system known in the art for processing voice. Thus, it is contemplated that the voice processing system 1000 may be configured and may include various topologies and protocols known to those skilled in the art.

For example, it is to be appreciated that though FIG. 1 only shows only two modality input devices, the various exemplary aspects of the present invention is not limited to any particular number of input device.

Figure 2:
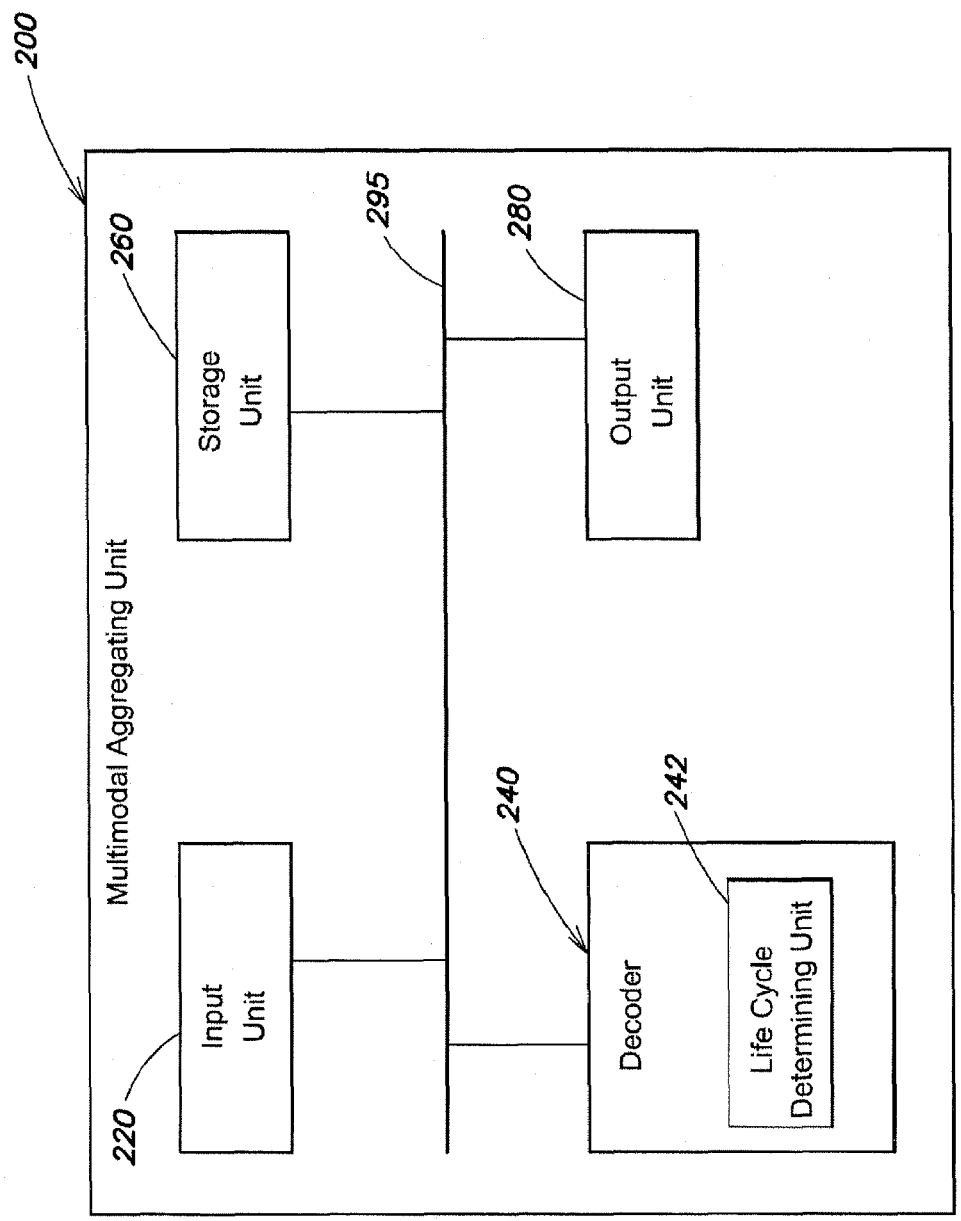
FIG. 2 shows an exemplary multimodal aggregating unit embodying the exemplary aspects of the present invention.

FIG. 2 shows an exemplary multimodal aggregating unit 200 embodying the exemplary aspects of the present invention. As shown in FIG. 2, the multimodal aggregating unit 200 includes an input unit 220, a decoder 240 including a life cycle determining unit 242, a storage unit 260, and an output unit 280, all connected by bus 295.

In operation, the decoder 240 receives a user multimodal input from the input unit 220, extracts and interprets interaction ergonomics of the input based on data from the storage unit 260 and the temporal constraints of the multimodal input determined by the life cycle determining unit 242, and provides the decoded data to the application control through the output unit 280. That is, temporally constrained multimodal aggregation is performed by the decoder 240, whereby a multimodal input from the user is recognized within a temporal window determined by the life cycle determining unit 242.

In accordance with an exemplary aspect of this invention, the first and second modalities may include interaction mechani-metrics and bio-metrics, whereby user interaction of at least one modality provides meaning to at least one other modality within the temporal constraints of the multimodal input. For example, a voice input may be used to give meaning to a touch input within the temporal window.

Although FIG. 2 shows a particular form of multimodal aggregating unit, it should be understood that other layouts are possible and that the various aspects of the invention are not limited to such layout. That is, it should be understood that the multimodal aggregating unit may include any variation of layout, whereby a plurality of modalities may be aggregated within the temporal constraints of the input according to the various aspects of this invention.

In operation, the decoder 240 receives the plurality of multimodal input from the input unit 220, and determines the life cycle of each input using the life cycle determining unit 242 and data stored in the storage unit 260. Based on the life cycles of the input of the plurality of modalities, the life cycle determining unit 242 determines the temporal constraints of the aggregation of the input, whereby the decoder 240 aggregates the multimodal input and decodes the aggregated result within the temporal window. The decoded result is then output via the output unit 280.

In an exemplary embodiment, an input of a first modality such as a sensed touch event is provided by the input unit 220 to the decoder 240. The life cycle determining unit 242 determines the life cycle of the sensed touch event. The decoder determines whether or not the sensed touch event makes sense and waits for the next modality input to provide meaning to the sensed touch event within the life cycle of the sensed touch event. Next, an input of a second modality such as a speech text input from a speech recognition device is provided by the input unit 220 to the decoder 240. The life cycle determining unit 242 then determines the life cycle of the speech text, whereby the temporal window is determined based on the overlap of the life cycle of the sensed touch event and the life cycle of the speech text. In the temporal window, the two modality input is aggregated, whereby the sensed touch event has been given meaning by the speech text, and the aggregated result is then decoded and output to the output unit 280.

Figure 3:
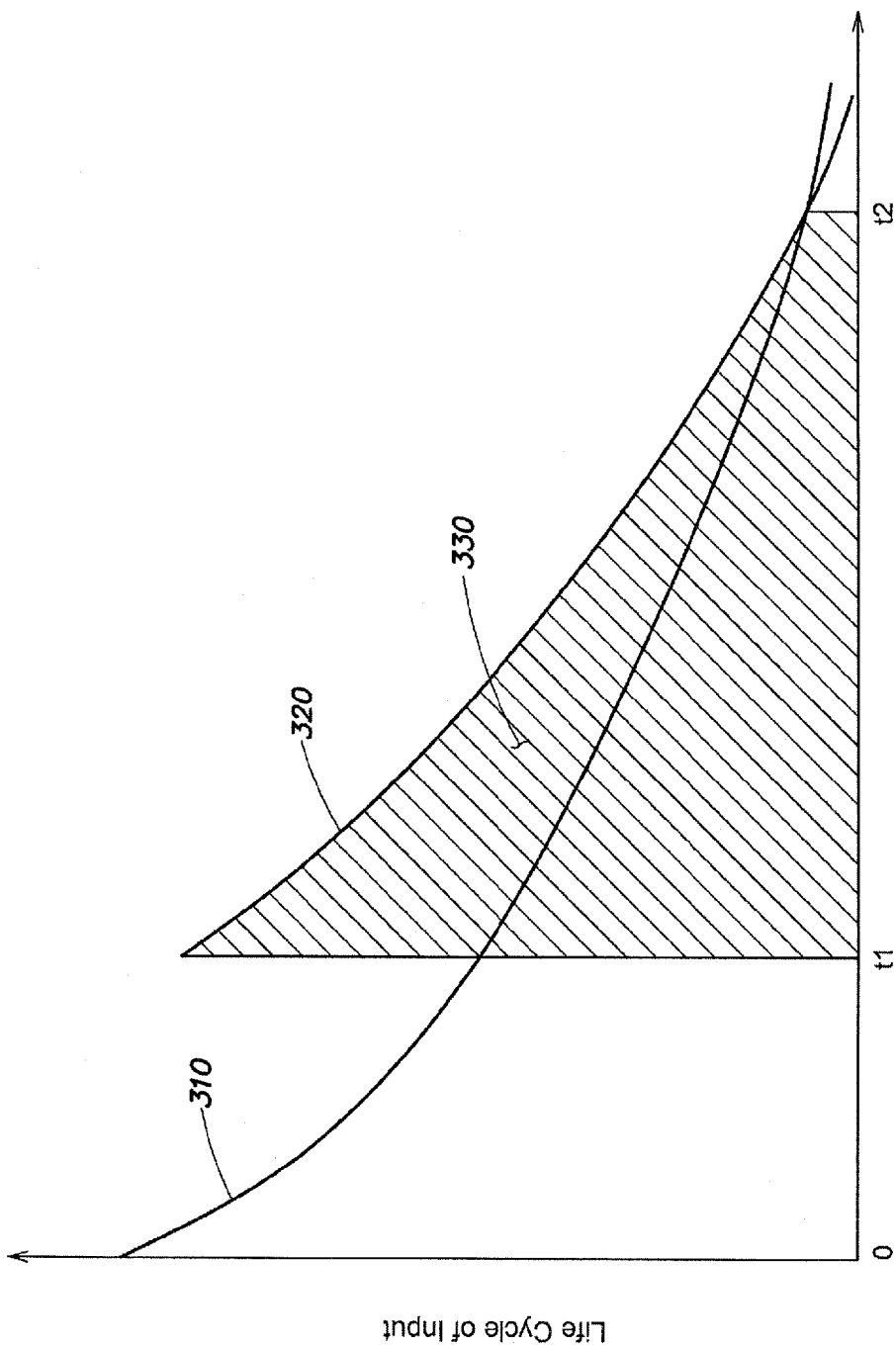
FIG. 3 shows an exemplary graph in association with a multimodal aggregating unit according to the exemplary aspects of the present invention.

FIG. 3 shows an exemplary graph in association with a multimodal aggregating unit in accordance with the exemplary aspects of this invention. As shown in FIG. 3, a graph is provided of an exemplary temporal constraint of a multimodal input, whereby the life cycle of each modality input is plotted as a function of time. In this exemplary embodiment, a first life cycle 310 represents the life cycle of an exemplary sensed touch event, and a second life cycle 320 represent the life cycle of an exemplary speech text input.

As shown in FIG. 3, at time 0, the sensed touch event is received by the decoder, and the life cycle of the sensed touch event begins, the life cycle being determined based on the data stored in the storage device corresponding to send touch events. Between time t1 and time t2, the speech text input, is received by the decoder, and the life cycle of the speech text event is determined based on the data stored in the storage device corresponding to speech text. As shown in FIG. 3, an overlapping region 330 determines the temporal window whereby the aggregation of the plurality of modality input is performed, whereby the aggregated result is decoded and then output to the application control.

Though the exemplary embodiment above describes graph in a particular embodiment, it should be appreciated that the graph may include various layouts known to those skilled in the art. For example, although FIG. 3 depicts a graph of a definite number of life cycles of a definite number of modality input, it should be understood that various layouts may also be applied in the various aspects of the invention, and that the present invention is not limited to the definite number of modality input having the definite number of life cycles.

Figure 4:
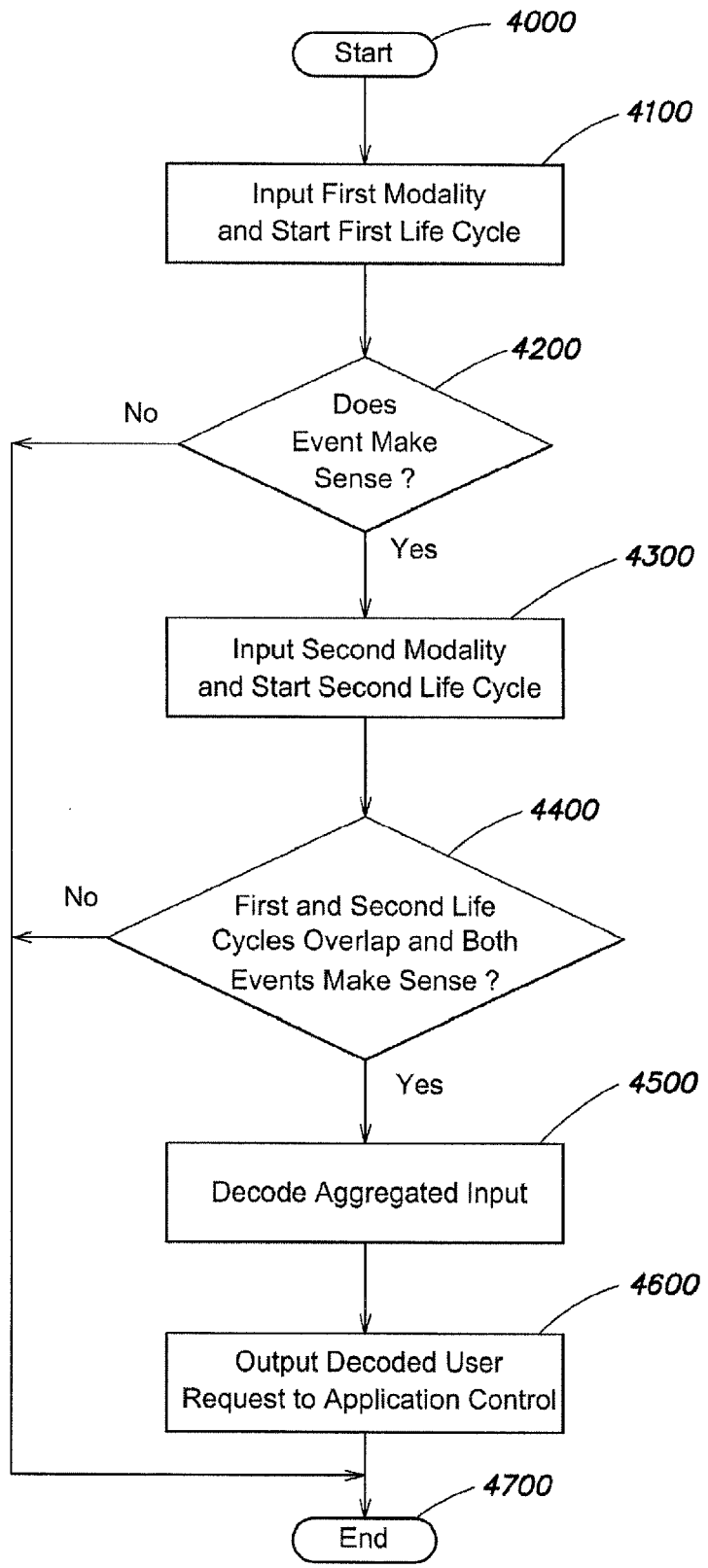
FIG. 4 shows a flowchart of an exemplary method for voice processing in accordance with the exemplary aspects of the present invention

FIG. 4 shows a flowchart of a method for voice processing according to the various exemplary aspects of the present invention. Beginning at step 4000, control proceeds to step 4100, where an input such as an application request of the first modality is received, and the first life cycle is initialized. Next, in step 4200, the input is analyzed to determine if the input makes sense. If the input does not make sense, control jumps to step 4700, where the process ends. Else, control proceeds to step 4300 to wait for the second input.

In step 4300, the second modality input is received and the second life cycle is initialized. Next, in step 4400, control determines whether the first life cycle and the second life cycle overlap, and that the combined first modality input and the second modality input make sense. If not, control jumps to step 4700 where the process ends. Else, the second modality input received within the temporal window provides meaning to the first modality input, and control continues to step 4500 where the aggregated multimodal result is decoded. Then, in step 4600, the decoded result is output to the application control whereby the decoded multimodal result is sent to the appropriate applications. Control then continues to step 4700 where the process ends.

In an exemplary embodiment of the present invention, the voice processing system is provided in an automotive vehicle for navigation, whereby the plurality of modality input devices include a speech recognition system with a microphone, and a touch event detector provided on a touch screen.

In this exemplary embodiment, a user such as the driver of the vehicle may press a location of the touch screen. The touch event detector senses that a touch event has occurred. The touch event thus triggers the start of the life cycle for the touch event, whereby the system is provided with an expectation that another input is forthcoming to bring meaning to the touch event within the life cycle of the touch event. The system then waits for the next input.

In this exemplary embodiment, to provide the second input, the user/driver may speak into the microphone the phrase "I want to go there," whereby the speech recognition device provides the speech text data of the spoken phrase, giving meaning to "there" as the location on the touch screen indicated by the sensed touch event. To bring meaning to the touch event, this speech input must be given within the determined temporal constraints that were determined based on the overlapping of the life cycle of the touch event and the life cycle of the speech text event. That is, the speech text must be received before the sensed touch expires in order to bring meaning to the touch event.

Accordingly, the multimodal aggregating unit analyzes the speech text data with the touch event data within the temporal constraints, whereby the aggregated request is decoded and sent to the application control whereby the application is run based on the decoded request. The feedback is then provided to the driver. For example, the touch screen may display the shortest route from to the location indicated by the driver on the touch screen.

It should be appreciated that the foregoing description of the invention has been presented only for purposes of illustration and description. It is not intended to be exhaustive or to limit the invention to the precise form disclosed, and other modifications and variations may be possible in light of the above teachings. Thus, the embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A method of processing user input, the method comprising:
   receiving a first input having a first modality;
   determining, with at least one processor, a first temporal window for the first input based, at least in part, on first data stored on at least one storage device, wherein the first data indicates a duration of the first temporal window associated with inputs received via the first modality;
   receiving a second input from the user having a second modality that is different than the first modality;
   determining whether the second input is received during the first temporal window;
   aggregating based, at least in part on whether the second input is received during the first temporal window, the first input and the second input to obtain an aggregated input;
   determining whether any portion of the second input is received after the first temporal window has expired; and
   wherein aggregating the first input and the second input comprises aggregating the first input and only a portion of the second input received during the first temporal window.

2. The method of claim 1, wherein aggregating the first input and only a portion of the second input comprises aggregating the first input and the entire second input, in response to determining that no portion of the second input is received after the first temporal window has expired.

3. The method of claim 1, further comprising:
determining whether the first input makes sense; and
aggregating the first input and the portion of the second input received during the first temporal window only when it is determined that the first input makes sense.

4. The method of claim 3, wherein determining whether the first input makes sense comprises determining whether an application associated with the first input accepts input according to the first modality.

5. The method of claim 3, wherein the first modality is speech; and
wherein determining whether the first input makes sense comprises determining whether the speech input matches an active grammar.

6. The method of claim 3, wherein the first modality is touch; and
wherein determining whether the first input makes sense comprises determining whether a location of the touch input corresponds to at least one field or button on a touch-sensitive display.

7. The method of claim 3, further comprising:
determining whether the second input makes sense; and
aggregating the first input and the portion of the second input received during the first temporal window only when the second input makes sense.

8. The method of claim 7, wherein determining whether the second input makes sense comprises determining whether the second input provides meaning to the first input.

9. The method of claim 7, wherein determining whether the second input makes sense comprises determining whether an application associated with the second input accepts input according to the second modality.

10. The method of claim 1,
wherein aggregating the first input and the portion of the second input comprises aggregating, in response to determining that at least some of the second input was received after the first temporal window expired, only the portion of the second input received during the first temporal window, wherein the portion of the second input received during the first temporal window is less than the entire second input.

11. The method of claim 1, further comprising:
determining a context based, at least in part, on the received first input; and
interpreting the received second input based, at least in part, on the context.

12. The method of claim 11, wherein the first modality is touch; and
wherein the context relates to a particular field or button corresponding to a location of the touch input on a touch-sensitive display.

13. The method of claim 12, further comprising:
determining whether the second modality is an acceptable modality for the particular field or button; and
aggregating the first input and the portion of the second input received during the first temporal window only when the second modality is an acceptable modality for the particular field or button.

14. The method of claim 12, wherein the second modality is speech; and
wherein determining whether the second modality is an acceptable modality comprises determining whether the particular field or button selected by the touch input is speech-enabled.

15. The method of claim 11, further comprising:
decoding the aggregated input to provide a decoded result; and
sending the decoded result to an application control.

16. At least one non-transitory computer readable medium encoded with instructions that, when executed by at least one processor, perform a method comprising:
receiving a first input having a first modality;
determining a first temporal window for the first input based, at least in part, on first data stored on at least one storage device, wherein the first data indicates a duration of the first temporal window associated with inputs received via the first modality;
receiving a second input from the user having a second modality that is different than the first modality;
determining whether the second input is received during the first temporal window;
aggregating based, at least in part, on whether the second input is received during the first temporal window, the first input and the second input to obtain an aggregated input;
determining whether any portion of the second input is received after the first temporal window has expired; and
wherein aggregating the first input and the second input comprises aggregating the first input and only a portion of the second input received during the first temporal window.

17. An apparatus comprising:
at least one processor programmed to:
receive a first input having a first modality;
determine a first temporal window for the first input based, at least in part, on first data stored on at least one storage device, wherein the first data indicates a duration of the first temporal window associated with inputs received via the first modality;
receive a second input from the user having a second modality that is different than the first modality;
determine whether the second input is received during the first temporal window;
aggregate based, at least in part, on whether the second input is received during the first temporal window, the first input and the second input to obtain an aggregated input;
determine whether any portion of the second input is received after the first temporal window has expired; and
wherein aggregating the first input and the second input comprises aggregating the first input and only a portion of the second input received during the first temporal window.

* * * * *